United States Patent Office 3,475,562
Patented Oct. 28, 1969

3,475,562
APPARATUS FOR CONTROL OF SEIZURE OF CENTRAL IDENTIFICATION APPARATUS OF A TELEPHONE PBX SYSTEM

Hermann Kellerer, Munich, Rudolf Weinfurter, Steinbach, Ulrich Körber, Munich, and Dieter Voegtlen, Starnberg, Germany, assignors to Siemens Aktiengesellschaft, Munich, Germany Filed Mar. 9, 1965, Ser. No. 441,954
Int. Cl. H04m *3/50*
U.S. Cl. 179—18 5 Claims

ABSTRACT OF THE DISCLOSURE

The disclosure is of a telephone arrangement, particularly of the PBX type, provided with a central system for identification of a calling station. The release of this central system is caused by a switching device in the central system which is controlled by a relay individual to each subscriber. The apparatus is also provided with signal path disruption or fault-responsive means, responsive to interruptions in the connection path, to actuate control switching devices which in turn operate respective group relays, each assigned to a group of stations, upon repeated occurrences of a disruption within the corresponding speaking station group. The respective group relays operate temporarily to suppress the call demands of stations of this group, but the control switching devices are released to release the group relay when call demands are received from speaking stations of another group.

GENERAL DESCRIPTION

Figure 1:
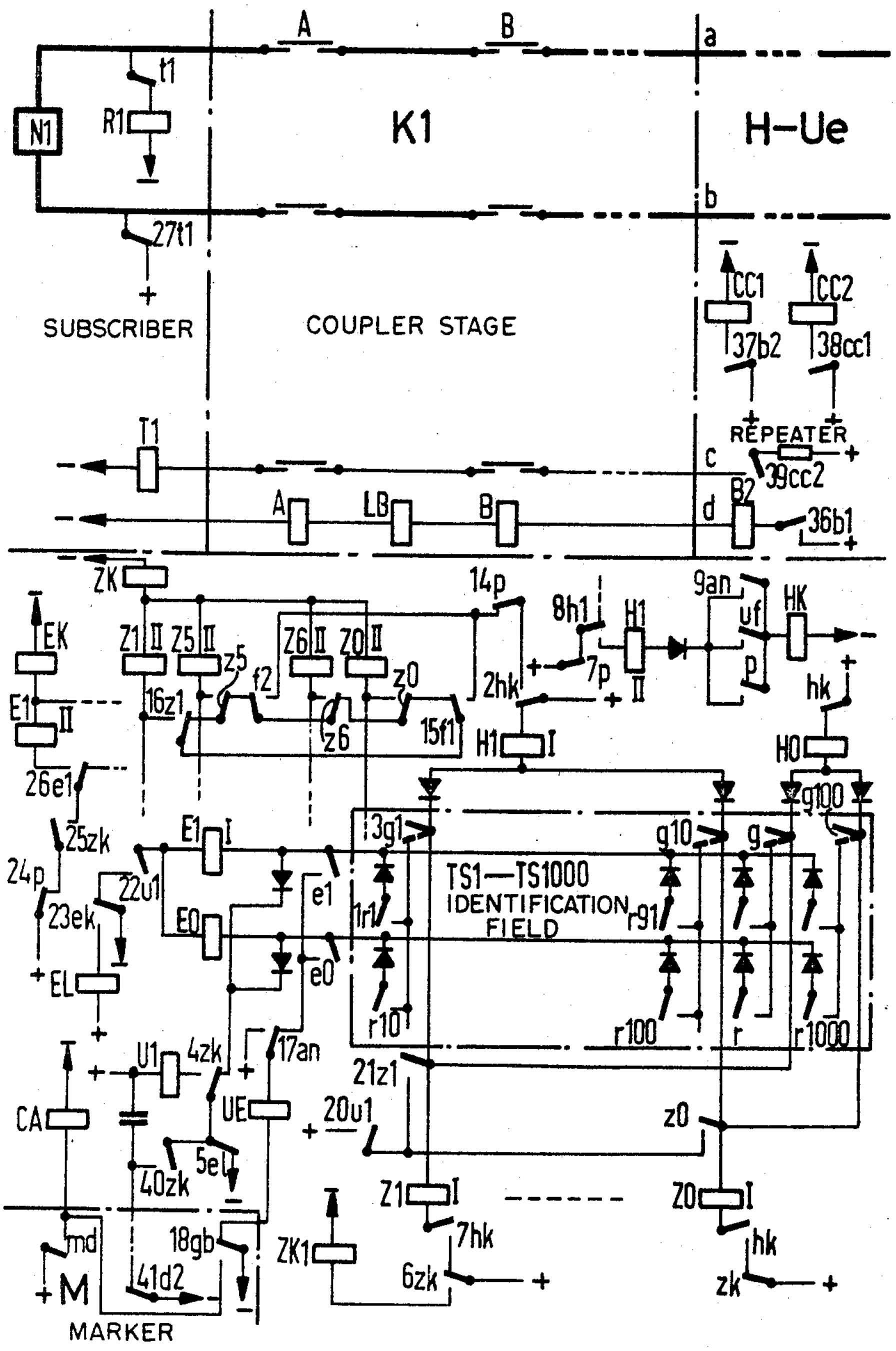

The invention concerns a switching arrangement for a telephone ssytem, in particular a telephone subscriber installation having extension stations (PBX), with a central system for the identification of a connection station emitting a call impulse, wherein the release of this central system takes place in dependence upon the control of a switching device for this system, which is controlled by a relay individual to the subscriber.

One type of known switching arrangement provides for release of a central control system and a central subscriber connection finder in dependence upon the completion of switching processes, by an impulse from the repeater assigned to the connection path, and, if the impulse does not appear within a set interval of time, by timed switching means. However, this technique is not advantageous for central systems which are available to all connection stations, for the identification of the station, each for a short time, and in particular if the timed switching devices cause release of the central system with respect to a connection station, in the case of repeated calling impulses.

Another known switching arrangement provides for connection of a calling speaking station, over the connection set, to a dial storage means. When this connection has been completed, switching devices in the dial storage means cause the release of the subscriber connection finder through connection of a potential to an auxiliary conductor of the subscriber circuit. The release of the subscriber connection finder thereby is made dependent on the disconnection of a subscriber call relay, which is ordinarily actuated upon the lifting of the receiver at the subscriber station, and which gives a call impulse to the subscriber connection finder to demand the connection of this connection finder, and to identify the called connection station.

It is the purpose of the present invention to avoid the unnecessary seizure of the identification means upon the occurrence of disruption or fault in the conductors of the connection path serving to establish the connection.

According to the present invention, this objective is accomplished through the fact that the said switching devices of the central system for identification are actuated (in a manner which is known) through disconnection of the subscriber-individual relay, as well as through signals from the central marker, such as path-busy signals. Further, these switching devices, depending upon the disruptions in the switching devices identifying the central system, actuate further devices for control of a group relay assigned to a group of speaking stations. Upon the repeated occurrence of a disruption within the corresponding speaking station group, this group relay temporarily suppresses the call impulses of speaking stations of this group. Through this arrangement, immediately after recognition of repetition of disruption of conductors of the connection path, a temporary blockage takes place for the group of speaking stations, including the one subject to the disruption, in such a way that call impulses from these speaking stations temporarily have no effect on the subscriber connection finder. This is in order to avoid speaking stations of other groups being unnecessarily blocked through the occurrence of such a disruption, and repeated useless requests for the subscriber connection finder.

According to a further development of the invention, the fact of disruption is signalled so that the disruption can be eliminated by supervisory personnel.

DETAILED DESCRIPTION

The invention will now be more fully described in conjunction with drawings showing a preferred embodiment of the apparatus of the invention.

Figure 2:
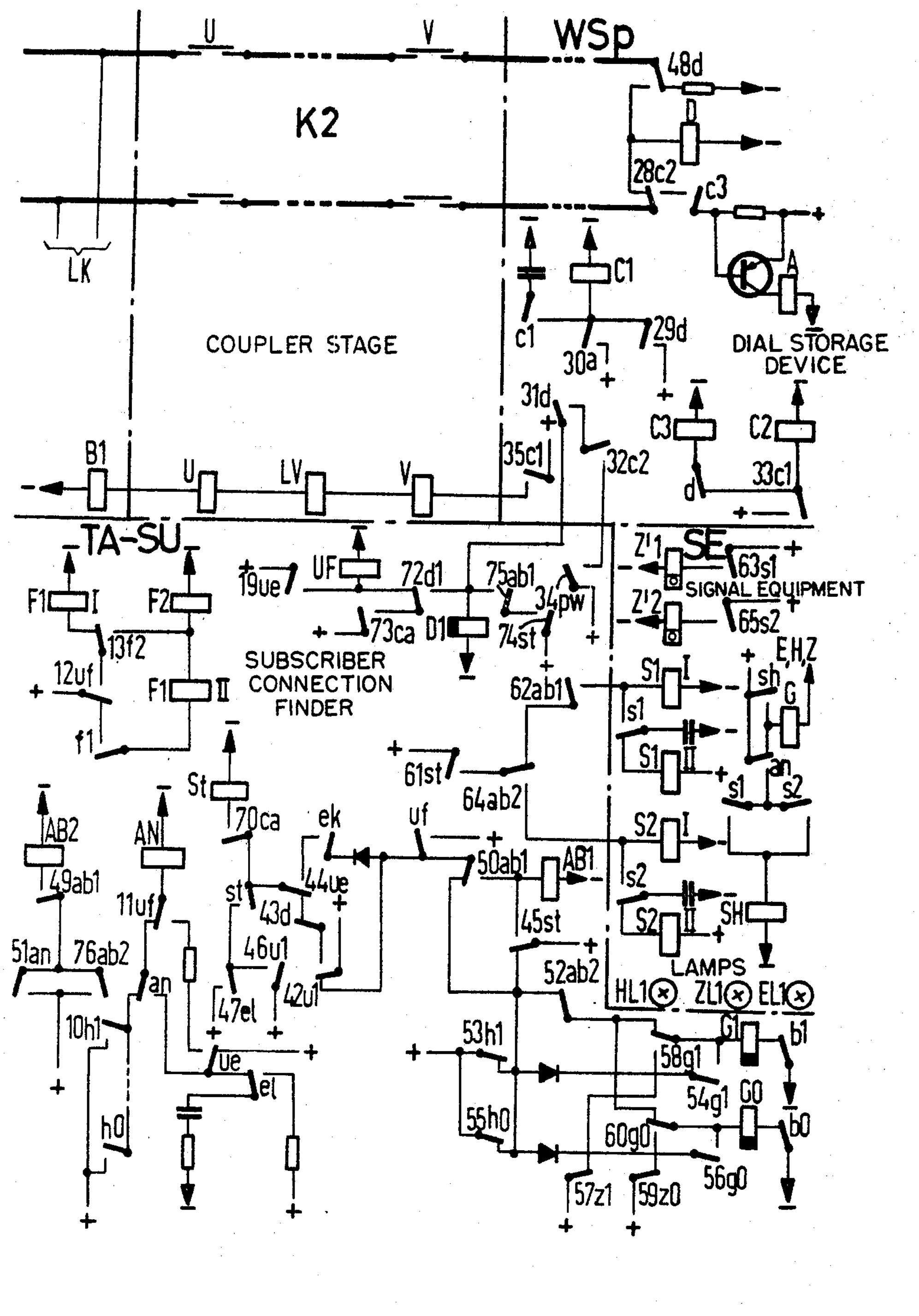

Referring to the drawings,

FIG. 1 is a partial schematic diagram of sufficient of the details of a PBX installation for a complete understanding of the invention; and, FIG. 2 is a partial schematic diagram completing that shown in FIG. 1.

The subscriber connection TS1 is shown connected over the coupling points of couplers A and B of coupler stages K1 with a house repeater H–U*e*. A dial storage device WS*p* is connectable to this house repeater H–U*e*, over the couplers U and V of the coupler stages K2. This dial storage device evaluates the dial signals transmitted by the subscriber. A further purpose of the dial storage device is to supervise the conductors extending to the subscriber station.

In known manner, through a contact of the subscriber calling relay (for example R1), each calling signal is evaluated for the identification of the calling speaking station in the subscriber connection finder TA–SU provided for that purpose. This is in order that the connection of the calling speaking station to a free repeater may be controlled. In the subscriber connection finder TA–SU there are further assigned switching means which supervise the conductors to the subscriber, as well as further faults or interruptions, in order to guarantee that the seizure time of the subscriber connection finder is reduced to a minimum, since this connection finder is common to all, or to a group of, speaking stations. An apparatus to signal the faults or interruptions is connected to the subscriber connection finder TA–SU.

It is assumed that the subscriber of speaking station N1 actuates relay R1 in known manner through loop closure caused, for instance, by lifting of the receiver. In this case the calling signal is identified through operation of contacts 1*r*1 in the identification field TS1–TS1000. Since in this identification field, the contacts *g*1 to *g*100 of the holding current supervisory relays G1 to G100 are actuated, unless another calling signal is then being processed (causing operation of one of contacts 2*hk*, 4*zk*, 5*e*1), an operating circuit is formed, for example, by closure of subscriber relay contacts 1$r$1, for the relay H1 over contacts 2$hk$, 3$g$1, 1$r$1, 4$zk$ and 5$e$1. The relay AN of connection finder TA–SU is then actuated over contacts 11$uf$ by the resulting closure of contacts 10$h$1.

A holding circuit is then formed for the relay H1 (in which also the relay HK is actuated) over contacts 7$p$, 8$h$1 and 9$an$. The operation of the relay HK prevents several calling signals from becoming effective simultaneously.

After the identification of the hundreds group to which the calling speaking station belongs (by operation of relay H1), the identification of the tens group takes place, this being through formation of an energizing circuit for relay Z1 (shown beneath field TS1–TS1000) over contacts 6$zk$, 7$hk$, 3$g$1, 1$r$1, 4$zk$ and 5$e$1. The relay Z1, in the same fashion as the relay H1, is held over a chain of sequence shifting contacts, which guarantees that only one of these relays remains actuated at any one time, that being in a circuit in which relay ZK is also actuated (shown just beneath subscriber station N1).

The relay UE (shown at the lower left) is operated over now-closed contacts 17$an$ and normally closed contacts 18$gb$, and relay UF (shown underneath coupler K2) is also operated by the resulting closure of contacts 19$ue$. Relay F1 (of connection finder TA–SU) is then operated over now-closed contacts 12$uf$ and the holding circuit for relay Z1 (II) and the operating circuit for relay ZK then close through contacts 2$hk$, 14$p$, 15$f$1 and 16$z$1.

By operation of relay ZK an operating circuit is then formed for the relay U1 (lower left) as follows:

(1) +, U1, 4$zk$, 5$e$1, –

As a result, an operating circuit for relay E1 (I) is completed, through contacts 20$u$1, 21$z$1, 3$g$1, 1$r$1, 22$u$1 and 23$ek$. A holding circuit is then formed for units identification relay E1 over contacts 24$p$, 25$zk$ and 26$e$1, and relay EK (beneath subscriber N1) is also operated in this circuit.

The relays for the units identification are also held, in known manner, over a contact chain of sequence shifting contacts, in order that not more than one unit relay is actuated at one time.

The following operating circuit is formed for relay EL (shown at lower left):

(2) +, EL, 23$ek$, –

Through operation of identification relays H1, Z1 and E1, the speaking station N1 is identified by the connection number 111, so that this station can be marked at coupler A in a manner not shown. After the search for a free house repeater and the identification of this repeater at coupler B, over an appropriate free intermediate line, a connection path is established between this speaking station and the free repeater thereby identified.

As a consequence of the interconnection of speaking station N1 with house repeater H–U$e$, a free dial storage device, for example WS$p$, is connected to the house repeater H–U$e$, in a manner not shown. Then, over the $b$-conductor, the following circuit can be formed for relay D of the dial storage device:

(3)
+, 27$t$1 (subscriber circuit), coupling points A/B (K1), $b$-conductor, . . . , H–U$e$, coupling points U/V (K2), . . . , 28$c$2, D, –

An operating circuit is then formed for the relay C1, independent of the contacts 30$a$, through closure of contacts 29$d$ in the dial storage device. Upon operation of relay C2 over contacts 33$c$1, the relay D1 (shown beneath coupler K2) of the subscriber connection finder is operated over the following circuit:

(4) +, 34$pw$, 32$c$2, 31$d$, D1, –

The operation of this relay D1 first of all identifies in the subscriber connection finder TA–SU that there is no interruption in the $b$-conductor between the dial storage device WS$p$ and the subscriber.

Since the coupling relays U and V for the coupling stages K2 are connected in a holding circuit over contacts 35$c$1, the relay B1 is also actuated. As a result, the relay B2 (of repeater H–U$e$) is operated over contacts 36$b$1 in the holding circuit of the coupling relays A, B for the coupling stages K1. Relay CC1 (of the repeater) is then operated over the contacts 37$b$2, and an operating circuit for relay CC2 is formed over contacts 38$cc$1. As a result of this sequence, after the connection of the dial storage device WS$p$ over the house repeater H–U$e$ to the subscriber circuit TS1, an operating circuit for the subscriber disconnect relay T1 is formed over the contacts 39$cc$2.

The operation of the subscriber disconnect relay T1 in subscriber connection circuit TS1 causes interruption of the holding circuit for the relay R1, so that contacts 1$r$1 are also opened.

The relay AN in the subscriber connection finder TA–SU was disconnected through the operation of relay UF which caused opening of normally closed contacts 11$uf$. The following holding circuit was then formed for the previously-operated relay UE:

(5)
+, 20$u$1, 21$z$1, 3$g$1, 1$r$1, $e$1, 17$an$, UE, 18$gb$, –

In this circuit the relay UE supervises the circuit condition of the subscriber calling relay R1. As a result, when the contacts 1$r$1 are opened, the relay UE is deenergized. Thereby, immediately after the interconnection of the dial storage device to the subscriber speaking station N1, the release of the subscriber connection finder TA–SU is brought about.

The marking of the speaking station is no longer required for this switching process. Consequently, relay UF is disconnected through the opening of contacts 19$ue$. Also, the following relays are successively disconnected: HK, H1, ZK, Z1, EK, E1 and EL.

The relay UE can also be disconnected through contacts 18$gb$ of the marker M upon the occurrence of a busy condition of the path for the interconnection of the calling station to the repeater.

When all of the house repeater devices are engaged, corresponding relays are operated for the disconnection of relays G1 to G0, through contacts $b$1–$b$0. In such case the subscriber connection finder accepts no calling signals. The exchange office repeaters can be assigned in group fashion to the speaking stations.

For a reason to be explained hereinafter, the operation of relay S$t$ in connection finder TA–SU is prevented so long as relay UE is operated.

The following holding circuit has previously existed for relay U1:

(6) +, U1, 4$zk$, 40$zk$, 41$d$2, –

Upon disconnection of contacts 4$zk$ and 40$zk$ by release of relay ZK, the relay U1 is therefore released. Thereby, the subscriber connection finder TA–SU is available (or free) for the processing of the next calling signal, since the contacts 20$ul$ are open.

However, different conditions can occur before identification and marking of the calling speaking stations, and also different cases of interruption in the connection path between the dial storage device and the speaking station can occur. These events are ascertained in the arrangement in accordance with the invention, through the switching means assigned to the dial storage device or to the subscriber connection finder. In the following numbered sections, a few interruption cases are described.

(1) Premature dialing

If the subscriber of the calling speaking station dials an identification digit before the identification and marking operations are completed, the contacts 1$r$1 are opened prematurely and thereby the holding circuit 5 for the relay UE is opened prematurely. Thus, before any actuation of the interconnection relay D1 can occur through operation of relay D, the release of the subscriber connection finder TA–SU occurs, in the fashion described above. Since in this case the marker M is not connected, and the relay CA is not operated, the relay S*t* for control of the signalling operation is not actuated over the contacts 70*ca*.

The relationship of the dial signal actuation time to the dial signal interval (for example 60/60 s.), as well as to the reception time (30 s.), of the dial storage device is such that even before the reception of a dial signal which can be evaluated, the release of the subscriber connection finder occurs through operation of relay R1, either directly or by means of the operation of relay T1. Upon release of the subscriber connection finder, in the case of premature dialing, the dial storage device is also released, so that improper dialing due to premature dialing operation is therefore impossible.

(2) Premature interruption of the subscriber loop due to replacing of the receiver In this case also the subscriber calling relay is prematurely disconnected and, as has already been described in section 1 above, the relay UE is thereby disconnected. This operation brings about the release of the subscriber connection finder TA–SU. There follows a short-time fault signal, but since relay CA is not operated, relay S*t* is also not operated.

(3) Supervision of the *c*-conductor

By actuation of the couplers A, B of the coupling stage K1 in a fashion not shown, a continuous ground connection is formed by the *c*-conductor, so that operation of relay T1 occurs before a dial storage device is connected to the house repeater. In this case, through control of relay R1, there also occurs the release of the subscriber connection finder. In such case, the marker is connected to the subscriber connection identifier and the relay CA is actuated in the marker over contacts *md*, in order to identify that the dial storage device is connected through to the subscriber over the house repeater.

The relay S*t* is operated for a short time over the then-closed contacts 42*ul*, 43*d*, 44*ue*, and 70*ca*, to signal faults or interruptions. Since the relay D1 is not operated, relay UF is held operated over contacts 73*ca*. The relay AB1 (shown at lower right in TA–SU) is operated over contacts 45*st*, so that an operating circuit for relay D1 is then formed over contacts 74*st* and 75*ab*1. Upon operation of relay D1, the contacts 72*d*1 interrupt the operating circuit for relay UF. In such fashion the release of the subscriber connection finder is accomplished in the manner already described.

(4) Interruption of the *b*-conductor

In the case of an interruption of the *b*-conductor, the relay D is not operated in circuit 3. As a result, relay D1 does not become effective in the subscriber connection finder TA–SU in circuit 4. Consequently, upon disconnection of relay R1, as a result of the fault or interruption, and by actuation of relay T1, caused by loop interruption of the calling speaking station, the subscriber connection finder TA–SU is released through interruption of the operating circuit for relay UE. The following operating circuit is formed for the fault identification relay S*t*:

(7) +, 42*u*1, 43*d*, 44*ue*, 70*ca*, S*t*, –

The relay AB1 is then operated over now-closed contacts 45*st*.

Holding circuits are then formed over contacts 46*u*1 and 47*e*1 for the relay S*t*. However, relays U1 and EL are disconnected in the releasing process for the subscriber connection finder, so that the fault identification relay S*t* is only effective for a short time period.

The release of the subscriber connection finder takes place as described above in section 3 hereof.

(5) Interruption of the *a*-conductor

If an interruption of the *a*-conductor occurs, then, following operation of the relay D in the dial storage device WS*p*, and after operation of contacts 48*d* and 28*c*2, no holding circuit is produced for the relay D over the contacts 27*t*1 in the subscriber circuit TS1. Consequently, by reason of premature disconnection of the relay D of the dial storage device WS*p*, relay D1, which has a delayed operating time, does not become operated. As a result, as described in section 4 in the case of the change into normal position of the contacts of relay R1, the relay S*t* is operated only for a short time period to signal interruptions.

(6) Repeated interruptions of speaking stations of the same hundreds group

If the relay S*t* is operated for the signalling of interruptions or faults, then relay AB1 (lower right of TA–SU) also becomes operated over contact 45*st*. The following holding circuit is then formed for relay AB1:

(9) +, 42*u*1, 50*ab*1, AB1, –

Then, contacts 49*ab*1 operate to prepare an energizing circuit for relay AB2 (middle of TA–SU). In the next seizure of the subscriber connection finder TA–SU, the relay AB2 is then operated over in the following circuit:

(10) +, 51*an*, 49*ab*1, AB2, –

The relay AB2 is then held over contacts 76*ab*2. The operating circuit for relays G1 to G0 (lowermost right) consequently is interrupted at contacts 52*ab*2. For these relays G1 to G0, each assigned to the different hundred group of speaking stations, a holding circuit can exist, e.g., over the series combination of contacts 53*h*1 and 54*g*1 (when relay G1 is operated to indicate that the calling subscriber is from hundreds group 1), or the combination of contacts 55*h*0 and 56*g*0 (for hundreds group 0), or a holding circuit can exist over contacts 57*z*1 and 58*g*1 (for tens group 1), or over contacts 59*z*0 and 60*g*0 (for tens group 0).

In the case of an interruption or fault signal resulting from interrupted *a*-, *b*-, *c*-, or *d*-conductors, at any given time, the corresponding hundreds and tens identification relay is operated to open the corresponding holding circuit. As a result, the relays G1 to G0 can only be held through a delayed fall off of current, for example, by reason of a copper damping winding, or even by means of a condenser connected in parallel therewith. If one of these relays begins to drop off within a certain time period, then, for the group identification relay in question (such as G1), the holding circuit no longer exists and this relay cannot be reactuated over the operated contacts 52*ab*2 in the case of a second fault identification. Consequently, by opening of the corresponding contacts 3*g*1, the speaking stations of that speaking station group (the first hundreds group) cannot signal a calling operation for the time being.

It is only in the case of a following seizure signal from a speaking station of another group that relay AB1 is disconnected through operation of contacts 42*u*1, by reason of interruption of circuit 9. As a consequence, the holding circuit for relay AB2 is interrupted and the relay G1 is again operated. In the meantime, however, in the signalling equipment SE (middle right of drawing), the speaking station which initiated the fault or interruption signal is identified by operaton of the corresponding identification relays for this speaking station. For example, such identification is by actuation of the relays corresponding to relays H1, Z1 and E1, and through operation of corresponding signal lamps HL1, ZL1, and EL1. In the operating example shown in the drawing, the signal lamps preferably identify in each case the connection station which was last subject to a fault or interruption. The speaking station subject to fault and the kind of fault can also be identified by means of a printing apparatus, operated by corresponding state-sensing relays.

It is also possible in the signal equipment SE to count all interruptions which take place by control of the relay S1 over contacts 61_st_ and 62_ab_1, through corresponding control of counter Z'1 over contacts 63_s_1.

The relay S2 is controlled over contacts 61_st_ and 64_ab_2. Through operation of its contacts 65_s_2, and through corresponding counter Z'2, relay S2 makes it possible to count multiple interruptions or faults which succeed each other. If, for example, the subscriber connection finder is repeatedly seized by a certain calling speaking station, but without the connection being made, the apparatus of the invention avoids the use of expensive systems to detect interruptions. Rather, by a simple apparatus, not only is interruption or fault signalling guaranteed, but it is also guaranteed that a central control apparatus can be seized repeatedly only in a limited number of times by reason of interruptions or faults. In the operative embodiment described hereinabove, the limited number of times is two.

The relay G1, e.g., blocks the speaking station group only for the time period immediately following the seizure signal resulting from the fault and only after repeated appearance of this fault for a particultr speaking station. Furthermore, it is guaranteed that the appearance of a seizure signal from a speaking station of another speaking station group can cause reelase of the blocking relay, so that seizure by this new speaking station is possible and the group relay is blocked again only after the appearance of further multiple faults. This alternate blocking and releasing guarantees prevention of unnecessary interruption of a speaking station group, yet it also avoids unnecessary seizure by a calling signal of one and the same speaking station group which cannot be successfully connected with a dial storage device by reason of interrupted conductors. Moreover, this system guarantees that the interrupted conductors will be identified. Furthermore, by means of one of the relays S1 or S2, the operation of an appropriate alarm can be carried out in a manner not specifically shown.

The disconnection of relays AB2, G1, etc., can also be effected from a time-controlled switch, providing, for example, a 1 minute delay. In this fashion, blocking of a speaking station group can occur, depending on the time-controlled switch, after more than one interruption caused by any given connection station.

It will be evident that many minor changes could be made in the construction of the operative embodiment described herein without departure from the scope of the invention. Accordingly, the invention is not to be considered limited to the specific embodiment described but rather only by the scope of the appended claims.

We claim:

1. A switching arrangement for a PBX telephone installation having a central marker for marking a connection path and a central system for identification of a station supplying a call demand, wherein the release of said central system is controlled by switching means in the central system which are in turn controlled by relay means individual to each subscriber, characterized by the fact that said switching means (UE, UF) of the central identication system (TA–SU) are independently operated by release of said individual relay (e.g., R1) and by signals from the central marker (M) (e.g. path-busy signal 18_gb_), and that the arrangement is provided with fault-responsive means (D1, S_t_) so associated with the connection path to respond to disruptions therein, control switching devices (AB1, AB2), and group relays e.g. G1), each group relay being assigned to a group of stations, said fault-responsive means being connected to said control switching devices for operation thereof upon repeated occurrence of a disruption of the connection path of a station connected to said central system, said control switching devices being connected to said group relays for operation of the group relay corresponding to the station whose connection path is interrupted, upon repeated call demands by stations of that group, said group relay being operable to prevent seizure of the central system by the call demands of stations of that group.

2. The apparatus of claim 1, including disabling means responsive to receipt of a call demand from a station of another group to render such first-mentioned group relay ineffective to prevent seizure by the demands of the stations of the first-mentioned group.

3. The apparatus of claim 2, including time-controlled apparatus operable upon repeated appearance of a fault within a sattion group to render ineffective the group relay of that group.

4. The apparatus of claim 1, including means connected to said fault responsive means operable to identify line faults, count the number thereof, and identify the calling station associated therewith.

5. The apparatus of claim 1, in which a repeater is provided for each group of speaking stations, and including switching devices (_b_1 to _b_0) for each repeater actuated upon seizure of that repeater, the combination thereof being operable when all repeaters are seized to prevent the reception of call demands by said central system.

References Cited

UNITED STATES PATENTS 2,844,654 7/1958 Hemel.

3,337,692 8/1967 Bruglemans.

WILLIAM C. COOPER, Primary Examiner